United States Patent
Du et al.

(10) Patent No.: US 11,469,844 B2
(45) Date of Patent: Oct. 11, 2022

(54) METHOD AND APPARATUS FOR TRANSMITTING SERVICE FLOW BASED ON FLEXIBLE ETHERNET FLEXE

(71) Applicant: HUAWEI TECHNOLOGIES CO., LTD., Guangdong (CN)

(72) Inventors: Zongpeng Du, Shenzhen (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 16/910,759

(22) Filed: Jun. 24, 2020

(65) Prior Publication Data
US 2020/0322077 A1   Oct. 8, 2020

Related U.S. Application Data

(63) Continuation of application No. PCT/CN2018/113917, filed on Nov. 5, 2018.

(30) Foreign Application Priority Data

Dec. 27, 2017  (CN) .......................... 201711440049.9

(51) Int. Cl.
*H04J 3/16* (2006.01)
*H04J 14/00* (2006.01)
*H04L 49/20* (2022.01)
*H04L 49/356* (2022.01)

(52) U.S. Cl.
CPC ............ *H04J 3/1652* (2013.01); *H04L 49/20* (2013.01); *H04L 49/357* (2013.01); *H04J 2203/0085* (2013.01); *H04J 2203/0091* (2013.01)

(58) Field of Classification Search
CPC ..................................................... H04J 3/1652
See application file for complete search history.

(56) References Cited

U.S. PATENT DOCUMENTS

2017/0005742 A1 *  1/2017  Gareau .................. H04L 49/351
2017/0006360 A1   1/2017  Gareau
(Continued)

FOREIGN PATENT DOCUMENTS

CN      105450326 A      3/2016
CN      106411454 A      2/2017
(Continued)

OTHER PUBLICATIONS

OIF-FLEXE-01.0, "OIF Optical Internetworking Forum", Mar. 2016, total 31 pages.
(Continued)

*Primary Examiner* — Nathan M Cors

(57) ABSTRACT

Example embodiments of this application provide a method and an apparatus for transmitting a service flow based on FlexE. The method includes: sending, by a first network device, a first FlexE overhead frame to a second network device, where the first network device and the second network device transmit a service flow using a first FlexE group, and the first FlexE overhead frame includes FlexE group adjustment identification information and PHY information of a physical layer (PHY) included in a second FlexE group; receiving, by the first network device, a second FlexE overhead frame sent by the second network device, where the second FlexE overhead frame includes FlexE group adjustment acknowledgment identification information; adjusting, by the first network device, the first FlexE group to the second FlexE group; and sending, by the first network device, the service flow to the second network device based on the second FlexE group, to dynamically adjust a FlexE group.

19 Claims, 7 Drawing Sheets

(56) References Cited

U.S. PATENT DOCUMENTS

2018/0145928 A1     5/2018    Zhong et al.
2021/0281344 A1*   9/2021    Deng .................... H04J 3/1658

FOREIGN PATENT DOCUMENTS

| | | |
|---|---|---|
| CN | 106612203 A | 5/2017 |
| CN | 107437973 A | 12/2017 |
| EP | 2232938 B1 | 8/2012 |

OTHER PUBLICATIONS

Supplementary Search Report dated Oct. 19, 2020, issued in CN Application No. 2017114400499, total 2 pages.

I. Hussain et al,"FlexE Usecases draft-hussain-ccamp-flexe-usecases-00", Internet Engineering Task Force Internet-Draft, Jun. 20, 2016, total 18 pages. XP015113586.

Editor G.7044,"Draft Recommendation ITU-T G.7044 (for consent)", International Telecommunication Union, Study Group 15, TD 462 (PLEN/15), Geneva, Dec. 5-16, 2011, total 30 pages. XP044040095.

Huawei Technologies Co., Ltd, et al,"Considerations on the mapping of FlexE Client and Subrate signals into OTN", International Telecommunication Union, COM15-C1195-E, Jun. 8, 2015, total 13 pages. XP044136869.

Extended European Search Report dated Dec. 8, 2020 issued in EP Application No. 18895641.1, total 9 pages.

Notice of Allowance issued in CN202110085816.9, dated Mar. 3, 2022, 4 pages.

* cited by examiner

METHOD AND APPARATUS FOR TRANSMITTING SERVICE FLOW BASED ON FLEXIBLE ETHERNET FLEXE

CROSS-REFERENCE TO RELATED APPLICATIONS

This application is a continuation of International Application No. PCT/CN2018/113917, filed on Nov. 5, 2018, which claims priority to Chinese Patent Application No. 201711440049.9, filed on Dec. 27, 2017, the entire contents of each of which are incorporated by reference in their entirety.

TECHNICAL FIELD

This application relates to the flexible Ethernet field, and more specifically, a method and an apparatus for transmitting a service flow based on flexible Ethernet (FlexE).

BACKGROUND

Flexible Ethernet (Flex Eth or FlexE) is a more advanced Ethernet technology developed based on conventional Ethernet. A variable rate interface between a router and an optical transport network (OTN) is provided in the FlexE, mainly to simplify mapping and transmission manners of an Ethernet interface in the OTN as much as possible. In the FlexE, a higher or more flexible transmission rate may be implemented based on a link binding technology and a flexible mapping manner between the Ethernet interface and the OTN.

In the FlexE, a concept of a flexible Ethernet group (FlexE Group, referred to as a FlexE group below) is introduced based on the conventional Ethernet. The FlexE group may be formed by binding one or more physical layers (PHYs), and a bandwidth resource corresponding to one FlexE group is a sum of bandwidth resources corresponding to PHYs in the FlexE group. Therefore, in the FlexE, a higher transmission rate can be met based on the FlexE group.

In the prior art, a FlexE group is statically configured. If the FlexE group needs to be modified, a service needs to be suspended first, and then FlexE service transmission is enabled after the FlexE group is reconfigured. In this manner, the service is interrupted. Therefore, a flexible configuration of the FlexE group needs to be provided.

SUMMARY

Example embodiments of this application provide a method and an apparatus for transmitting a service flow based on flexible Ethernet, so that a service does not need to be suspended while reconfiguring a FlexE group, and a PHY in a FlexE group can be dynamically adjusted to meet a service requirement.

According to a first aspect, a method for transmitting a service flow based on flexible Ethernet (FlexE) is provided. The flexible Ethernet includes a first network device and a second network device, and the first network device and the second network device transmit the service flow by using a first FlexE group. The method includes:

sending, by the first network device, a first FlexE overhead frame to the second network device, where the first FlexE overhead frame includes FlexE group adjustment identification information and PHY information of a physical layer (PHY) included in a second FlexE group, the FlexE group adjustment identification information is used to indicate that the first network device requests the second network device to adjust the first FlexE group to the second FlexE group, and the first FlexE group is different from the second FlexE group;

receiving, by the first network device, a second FlexE overhead frame sent by the second network device, where the second FlexE overhead frame includes FlexE group adjustment acknowledgment identification information, and the FlexE group adjustment acknowledgment identification information is used to indicate that the second network device notifies the first network device that the second network device is ready to adjust the first FlexE group;

adjusting, by the first network device, the first FlexE group to the second FlexE group based on the PHY information of the physical layer (PHY) included in the second FlexE group; and sending, by the first network device, the service flow to the second network device based on the second FlexE group.

In this embodiment, the first network device sends the first FlexE overhead frame to the second network device, and the first FlexE overhead frame includes the FlexE group adjustment identification information and the PHY information of the physical layer (PHY) included in the second FlexE group. The first network device receives the second FlexE overhead frame returned by the second network device. To be specific, the first network device and the second network device learn, through a handshake operation, that both the first network device and the second network device are ready to adjust the first FlexE group. In this way, the first network device adjusts the first FlexE group based on the PHY information of the physical layer (PHY) included in the second FlexE group without a need to suspend a current service, so that a Flex group can be dynamically adjusted.

Optionally, the adjusting the first FlexE group to the second FlexE group includes: adding a PHY to the first FlexE group, or deleting a PHY from the first FlexE group, or replacing a PHY in the first FlexE group, or the like.

Optionally, the FlexE group adjustment identification information may be represented by using a value corresponding to group request (GR) information. Optionally, a GR may be located after fields in which a CR and CA are located and that are in an existing overhead frame structure.

Optionally, the FlexE group adjustment acknowledgment identification information may be represented by using a value corresponding to group acknowledgment GA information. Optionally, the GA may be located after a field corresponding to the GR.

In some possible implementations, the adjusting, by the first network device, the first FlexE group to the second FlexE group based on the PHY information of the PHY included in the second FlexE group includes:

adding, by the first network device, a first PHY to the first FlexE group to obtain the second FlexE group.

Therefore, the first network device may add a PHY to the first FlexE group to meet a service requirement.

In some possible implementations, before the adding, by the first network device, a first PHY to the first FlexE group, the method further includes:

performing, by the first network device, overhead frame locking and overhead multiframe locking on the first PHY based on a third FlexE overhead frame from the second network device, where the third FlexE overhead frame includes PHY information of the first PHY.

Therefore, the first network device performs a locking operation on a to-be-added PHY, so that it can be ensured that the to-be-added PHY establishes a connection between a receive end and a transmit end.

In some possible implementations, the adjusting, by the first network device, the first FlexE group to the second FlexE group based on the PHY information of the physical layer (PHY) included in the second FlexE group includes:

deleting, by the first network device, a second PHY from the first FlexE group to obtain the second FlexE group.

Therefore, the first network device may reduce a PHY from a current FlexE group to reduce a link.

In some possible implementations, before the sending, by the first network device, a first FlexE overhead frame to the second network device, the method further includes:

determining, by the first network device, a first quantity of slots, where the first quantity of slots is used to indicate a quantity of slots that correspond to the first FlexE group and that are not occupied by the service flow;

determining, by the first network device, the second PHY, where a bandwidth of the second PHY is less than or equal to a bandwidth corresponding to the first quantity of slots; and adjusting, by the first network device, a service flow transmitted by the second PHY to a PHY, other than the second PHY, in the first FlexE group.

In some possible implementations, the PHY information of the PHY included in the second FlexE group is carried in a reserved field in the first FlexE overhead frame; or the PHY information of the PHY included in the second FlexE group is carried in a field of an inactive calendar in the first FlexE overhead frame.

In some possible implementations, when the PHY information of the physical layer (PHY) included in the second FlexE group is carried in the field of the inactive calendar in the first FlexE overhead frame, the method further includes:

releasing, by the first network device at a preset moment, the field that is occupied by the PHY information of the PHY included in the second FlexE group and that is of the inactive calendar in the first FlexE overhead frame.

Therefore, the first network device may write the PHY information of the physical layer (PHY) included in the second FlexE group into an idle field of an overhead frame, to implement an exchange between the receive end and the transmit end about the PHY information of the PHY included in the second FlexE group.

According to a second aspect, a method for transmitting a service flow based on flexible Ethernet (FlexE) is provided. The flexible Ethernet includes a first network device and a second network device, and the first network device and the second network device transmit the service flow by using a first FlexE group. The method includes:

receiving, by the second network device, a first FlexE overhead frame sent by the first network device, where the first FlexE overhead frame includes FlexE group adjustment identification information and PHY information of a physical layer (PHY) included in a second FlexE group, the FlexE group adjustment identification information is used to indicate that the first network device requests the second network device to adjust the first FlexE group to the second FlexE group, and the first FlexE group is different from the second FlexE group;

sending, by the second network device, a second FlexE overhead frame to the first network device, where the second FlexE overhead frame includes FlexE group adjustment acknowledgment identification information, and the FlexE group adjustment acknowledgment identification information is used to indicate that the second network device notifies the first network device that the second network device is ready to adjust the first FlexE group; and receiving, by the second network device, the service flow sent by the first network device based on the second FlexE group.

In this embodiment, the second network device receives the first FlexE overhead frame sent by the first network device, and the first FlexE overhead frame includes the FlexE group adjustment identification information and the PHY information of the physical layer (PHY) included in the second FlexE group. The second network device returns the second FlexE overhead frame to the first network device. To be specific, the first network device and the second network device learn, through a handshake operation, that both the first network device and the second network device are ready to adjust the first FlexE group. In this way, the first network device adjusts the first FlexE group based on the PHY information of the physical layer (PHY) included in the second FlexE group without a need to suspend a current service, so that a FlexE group can be dynamically adjusted.

Optionally, the adjusting the first FlexE group to the second FlexE group includes: adding a PHY to the first FlexE group, or deleting a PHY from the first FlexE group, or replacing a PHY in the first FlexE group, or the like.

Optionally, the FlexE group adjustment identification information may be represented by using a value corresponding to group request (GR) information. Optionally, a GR may be located after fields in which a CR and CA are located and that are in an existing overhead frame structure.

Optionally, the FlexE group adjustment acknowledgment identification information may be represented by using a value corresponding to group acknowledgment GA information. Optionally, GA may be located after a field corresponding to the GR.

In some possible implementations, the method further includes:

adjusting, by the second network device, the first FlexE group to the second FlexE group based on PHY information in the service flow.

In some possible implementations, the second FlexE group is obtained after the first network device adds a first PHY to the first FlexE group.

In some possible implementations, the method further includes:

performing, by the second network device, overhead frame locking and overhead multiframe locking on the first PHY based on a third FlexE overhead frame from the first network device, where the third FlexE overhead frame includes PHY information of the first PHY.

Therefore, the second network device may perform overhead frame locking and overhead multiframe locking operations on a to-be-added PHY, so that the to-be-added PHY can be identified, and no error is reported.

In some possible implementations, the second FlexE group is obtained after the first network device deletes a second PHY from the first FlexE group.

In some possible implementations, the PHY information of the PHY included in the second FlexE group is carried in a reserved field in the first FlexE overhead frame; or the PHY information of the PHY included in the second FlexE group is carried in a field of an inactive calendar in the first FlexE overhead frame.

Optionally, the second network device may write the PHY information of the PHY included in the second FlexE group into a reserved field in the second FlexE overhead frame; or the second network device may write, into a field of an inactive calendar in the second FlexE overhead frame, the PHY information of the PHY included in the second FlexE group. In this way, the PHY information of the PHY included in the second FlexE group at a receive end is consistent with that at a transmit end.

According to a third aspect, an apparatus for transmitting a service flow based on flexible Ethernet (FlexE) is provided, and is configured to perform the method according to the first aspect or any possible implementations of the first aspect. Specifically, the apparatus includes modules configured to perform the method according to the first aspect or any possible implementations of the first aspect.

According to a fourth aspect, an apparatus for transmitting a service flow based on flexible Ethernet (FlexE) is provided, and is configured to perform the method according to the second aspect or any possible implementation of the second aspect. Specifically, the apparatus includes modules configured to perform the method according to the second aspect or any possible implementations of the second aspect.

According to a fifth aspect, an apparatus for transmitting a service flow based on flexible Ethernet (FlexE) is provided, and the apparatus includes a processor, a memory, a receiver, and a transmitter. The processor is connected to the memory, the receiver, and the transmitter. The memory is configured to store instructions; the processor is configured to execute the instructions; and the receiver and the transmitter are configured to communicate with another network element under control of the processor. When the processor executes the instructions stored in the memory, the execution enables the processor to perform the method according to the first aspect or any possible implementations of the first aspect.

According to a sixth aspect, an apparatus for transmitting a service flow based on flexible Ethernet (FlexE) is provided, and the apparatus includes a processor, a memory, a receiver, and a transmitter. The processor is connected to the memory, the receiver, and the transmitter. The memory is configured to store instructions; the processor is configured to execute the instructions; and the receiver and the transmitter are configured to communicate with another network element under control of the processor. When the processor executes the instructions stored in the memory, the processor is enabled to perform the method according to the second aspect or any possible implementation of the second aspect.

According to a seventh aspect, a computer readable storage medium is provided. The computer readable storage medium stores a program, and the program enables an apparatus to transmit a service flow based on flexible Ethernet to perform any one of the methods for transmitting a service flow based on the flexible Ethernet according to the first aspect or the implementations of the first aspect.

According to an eighth aspect, a computer readable storage medium is provided. The computer readable storage medium stores a program, and the program enables an apparatus for transmitting a service flow based on flexible Ethernet to perform any one of the methods for transmitting a service flow based on the flexible Ethernet according to the second aspect or the implementations of the second aspect.

According to a ninth aspect, a communications chip is provided. The communications chip stores instructions, and when the instructions are run on a communications chip, the communications chip is enabled to perform the method according to any possible implementations of any one of the foregoing aspects.

According to a tenth aspect, a computer program product including instructions is provided. When the instructions are run on a computer, the computer is enabled to perform the method according to any one of the aspects or any possible implementation of the aspects.

DESCRIPTION OF EMBODIMENTS

The following describes the technical solutions in this application with reference to the accompanying drawings.

The technical solutions in the embodiments of this application may be applied to flexible Ethernet (Flex Eth or FlexE). In conventional Ethernet, after passing through a switching board, usually, a service flow sequentially passes through components on an interface board of a device for processing. The interface board (also referred to as a line card) is connected to the switching board. Optionally, the components on the interface board may include modules or components such as a traffic management (TM) module, a network processor (NP), a media access control (MAC) layer module, and a physical layer (PHY) module.

The TM module mainly performs quality of service (QoS) control on the service flow based on a network transmission bandwidth and a priority of the service flow. For example, if a current transmission bandwidth is insufficient to ensure that all service flows pass, the TM module may ensure that a service flow with a high priority passes first, and perform packet discarding processing on a service flow with a low priority.

The NP is a core chip for processing an Ethernet service, and mainly performs forwarding and processing tasks for various Ethernet services, for example, performs packet processing, protocol analysis, route searching, and the like on Ethernet service data.

The MAC layer module is mainly responsible for connecting and controlling a physical medium at a physical layer. For a service packet in Ethernet, physical layer information may be encapsulated and decapsulated at this layer.

The PHY may be defined as providing mechanical, electronic, functional, and normative characteristics for establishing, maintaining, and removing a physical link required for data transmission. The PHY mentioned in this specification may include physical layer working components at a transmit end and a receive end, and a transmission medium (for example, an optical fiber) between the transmit end and the receive end. The physical layer working components may include, for example, a physical layer interface device in the Ethernet. Therefore, in the present disclosure, one PHY may be understood as a physical layer channel, and the physical layer channel includes a port of a receive end device, a port of a transmit end device, and a communications link between the two ports. Usually, numbers of one PHY at the receive end and the transmit end may be the same. Alternatively, even if numbers of the PHY at the receive end and the transmit end are different, the numbers are in a one-to-one correspondence.

Figure 1:
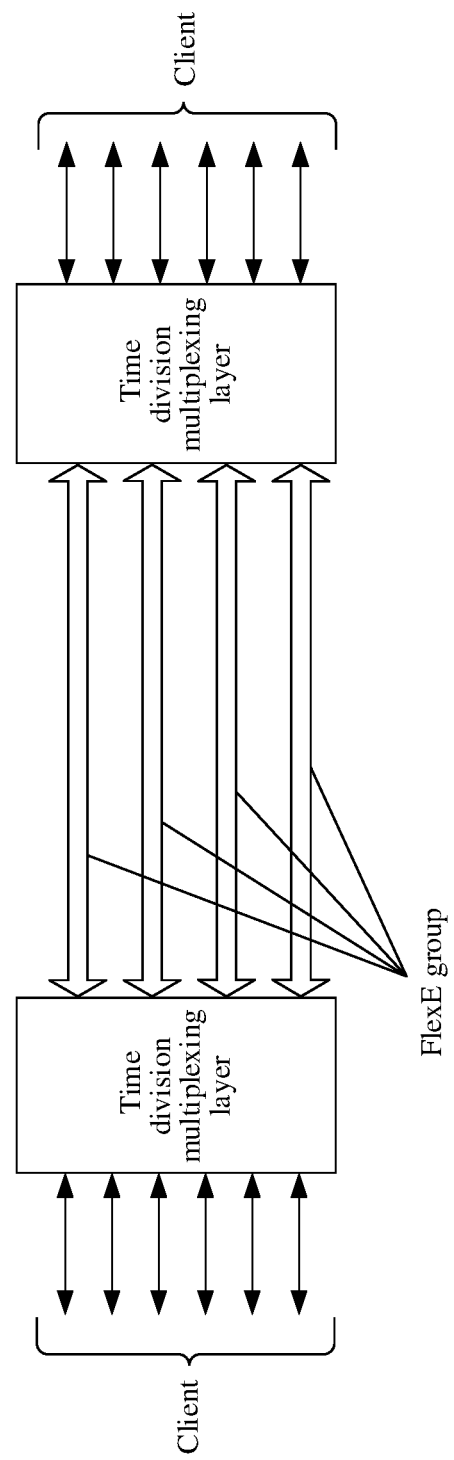
FIG. 1 is a schematic architectural diagram of flexible Ethernet (FlexE) according to an embodiment of this application.

Referring to FIG. 1, in FlexE, new concepts are introduced based on conventional Ethernet, such as a flexible Ethernet (FlexE) group, a flexible Ethernet client (FlexE client, referred to as a client below), a calendar, and a flexible Ethernet time division multiplexing layer (namely, FlexE shim, referred to as a shim below). For specific explanations or usage of these concepts, refer to the descriptions in a "Flex Ethernet Implementation Agreement" released by the optical internetworking forum (OIF).

FlexE group: The FlexE group may include one or more PHYs, for example, may include 1 to 254 PHYs supporting a rate of 100 GE. 0 and 255 are reserved bits. A bandwidth resource corresponding to one FlexE group is a sum of bandwidth resources corresponding to PHYs in the FlexE group. Therefore, in the FlexE, a higher transmission rate and a larger transmission bandwidth can be met based on the FlexE group. In the FlexE, a plurality of service flows may be transmitted in parallel by using the FlexE group, and service data of a same service flow may be carried in one PHY in the FlexE group, or may be carried in different PHYs in the FlexE group. In other words, service data of a same service flow may be transmitted to a peer end by using one PHY in the FlexE group, or may be transmitted to a peer end by using a plurality of PHYs in the FlexE group.

Client: Clients sent by a same FlexE group need to share a same clock, and these clients need to perform adaptation based on allocated slot rates. Bandwidth overheads of each client may be adapted by inserting/deleting an idle block.

Calendar: A bandwidth resource of one PHY is usually divided into a plurality of slots (for example, 20 slots). During actual use, service data is first encapsulated into slots, and then the slots should be mapped to a PHY in a FlexE group. A mapping relationship between the slots and the PHY is recorded in a calendar of the FlexE. Generally, in the FlexE, two calendar configurations are supported, for example, a calendar A and a calendar B. When a device is used, the calendar A includes slot content, and the slot content of the calendar A is used during interaction. In this case, the device does not care whether the calendar B includes the slot content. When the device performs switching negotiation with a peer device, the device fills an adjusted slot into the calendar B while running the calendar A, and then negotiates with the peer device. When the negotiation succeeds, both a receive end and a transmit end are switched to the calendar B. A calendar switching time may be negotiated by the receive end and the transmit end, and switching is performed on the receive end and the transmit end synchronously. In this way, when a service configuration of a client changes, a service of another client is not affected.

Shim: The shim is mainly used to slice service data based on a same clock, encapsulate the sliced service data into slots obtained through pre-division, and then map the slots obtained through pre-division to PHYs in a FlexE group based on a preconfigured calendar (which may be specifically configured by a user) for transmission. Each slot is mapped to one PHY in the FlexE group. The shim may separately correspond to a network device. Optionally, the network device may be a device supported by the FlexE, for example, a forwarding device or a forwarding node such as a switch or a router.

In an existing FlexE overhead mechanism, a PHY in a FlexE group not only transmits an information code block, but also transmits an overhead code block. Bit information included in a plurality of overhead code blocks (for example, overhead code blocks transmitted in one basic frame period) is combined to form an overhead area. The overhead area may be used to transmit information other than service data, such as code information and control information. Both a calendar and information used by a receive end and a transmit end for calendar switching by using a request-response mechanism may be carried in some fields of the overhead area for transmission. For a specific explanation, refer to the description in the "Flex Ethernet Implementation Agreement" released by the OIF.

Figure 2:
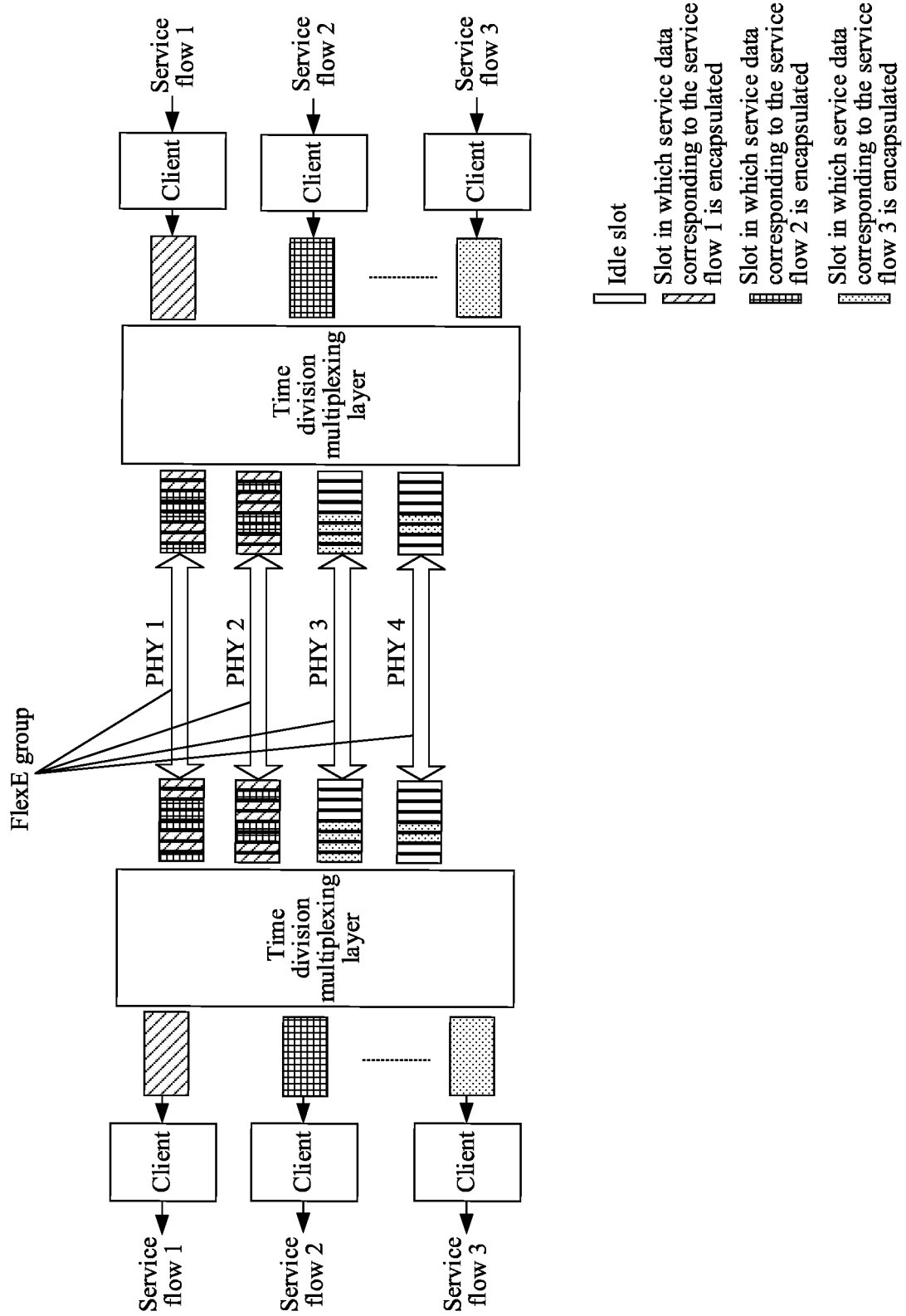
FIG. 2 is a schematic diagram of a conventional processing process of a FlexE service flow.

FIG. 2 shows a conventional processing process of a FlexE service flow. As shown in FIG. 2, a FlexE group includes a PHY 1 to a PHY 4, and the FlexE group may be used to transmit a service flow 1 to a service flow 3. A process of transmitting the service flow 1 is used as an example. On a sending side, conventional service processing may be first performed on the service flow 1 of a client. For example, QoS control may be performed by using a TM module connected to a transmit end, and then physical layer information may be encapsulated by using a MAC layer module. The client sends service data obtained after processing to a shim.

Then, the shim may perform slicing and slot encapsulation on the received service data (to be specific, encapsulate the service data into slots obtained through pre-division). Further, the shim may map, to a PHY in the FlexE group based on a preconfigured calendar, slots in which service data of the service flow 1 is encapsulated. As shown in FIG. 2, the slots in which the service data of the service flow 1 is encapsulated are mapped to the PHY 1 and the PHY 2. Then, the PHYs in the FlexE group may transmit the service data of the service flow 1 to a receive end by using an optical module connected to the receive end. The receive end reassembles, into the service flow 1 according to a reverse process of a processing process of the transmit end, the service data that is of the service flow 1 and that is transmitted on the PHYs in the FlexE group. Similarly, slots in which service data of the service flow 2 is encapsulated are mapped to the PHY 1 and the PHY 2. Then, the PHYs in the FlexE group may transmit the service data of the service flow 2 to the receive end by using the optical module connected to the receive end. The receive end reassembles, into the service flow 2 according to the reverse process of the processing process of the transmit end, the service data that is of the service flow 2 and that is transmitted on the PHYs in the FlexE group. Similarly, slots in which service data of the service flow 3 is encapsulated are mapped to the PHY 3 and the PHY 4. Then, the PHYs in the FlexE group may transmit the service data of the service flow 3 to the receive end by using the optical module connected to the receive end. The receive end reassembles, into the service flow 3 according to the reverse process of the processing process of the transmit end, the service data that is of the service flow 3 and that is transmitted on the PHYs in the FlexE group.

In FIG. 2, because a bandwidth corresponding to a total quantity of slots of the PHY 1 to PHY 3 can meet a bandwidth that needs to be occupied by the service flow 1 to the service flow 3 in total, slots at the PHY 4 does not need to be occupied. To be specific, when the service flow 1 to the service flow 3 are transmitted, the service flow 3 transmitted at the PHY 4 may be integrated into the PHY 3, and the PHY 4 is removed in the FlexE group, to reduce an unnecessary PHY link and reduce PHY link overheads. In the prior art, when a PHY in a FlexE group is changed, a service flow needs to be suspended first, and service transmission is restarted after configuration is completed. In this case, service is interrupted. Particularly, a multi-hop FlexE network requires better continuity or configuration automation of a service flow. However, a modification manner in the prior art cannot meet the requirement.

Figure 3:
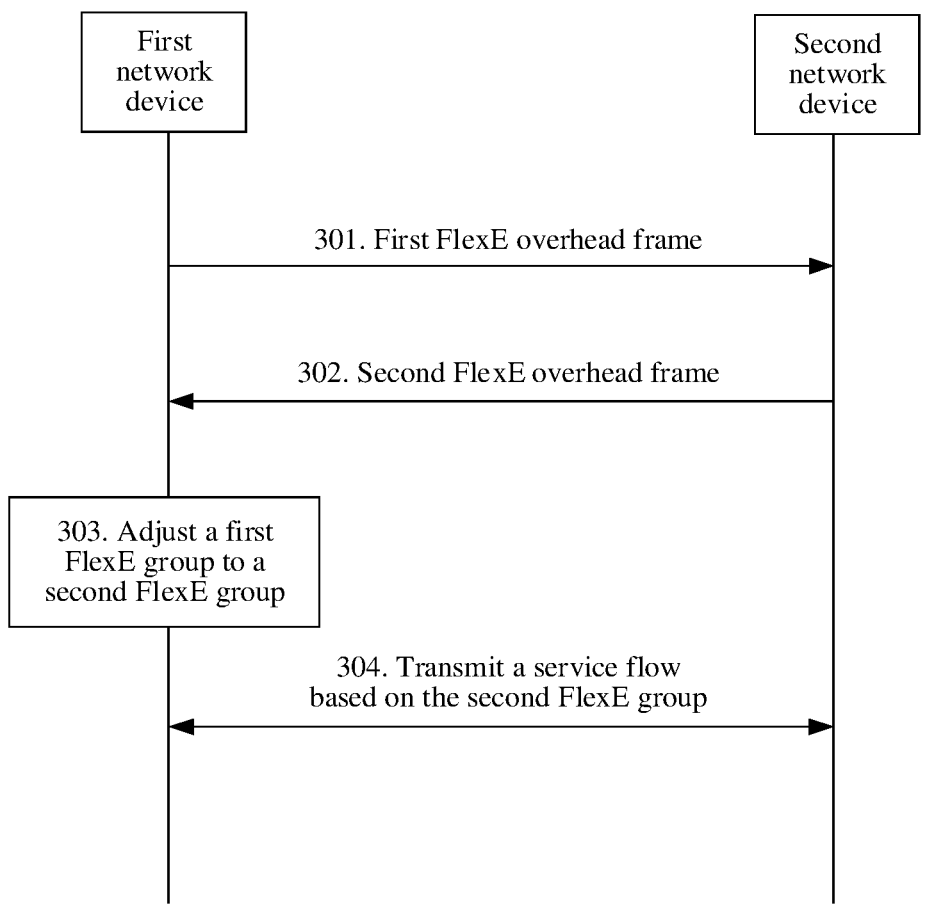
FIG. 3 is a schematic interaction diagram of a method for transmitting a service flow based on flexible Ethernet (FlexE) according to an embodiment of this application.

To dynamically adjust a PHY in a FlexE group, an embodiment of this application provides a method for transmitting a service flow based on flexible Ethernet, to support flexible switching of the FlexE group, and dynamically change a quantity of PHYs in the FlexE group based on a service requirement. With reference to FIG. 3, the following describes a method 300 for transmitting a service flow based on the flexible Ethernet (FlexE) according to an embodiment of this application. The flexible Ethernet includes a first network device and a second network device, and the first network device and the second network device transmit a service flow by using a FlexE group. As shown in FIG. 3, the method 300 includes the following steps.

S301. The first network device sends a first FlexE overhead frame to the second network device, where the first FlexE overhead frame includes FlexE group adjustment identification information and PHY information of a physical layer (PHY) included in a second FlexE group, the FlexE group adjustment identification information is used to indicate that the first network device requests the second network device to adjust the first FlexE group to the second FlexE group, and the first FlexE group is different from the second FlexE group.

Optionally, the PHY information includes information such as a PHY map and a PHY number. The PHY map is used to indicate a PHY member included in the FlexE group.

Specifically, the first network device may write the PHY information of the PHY included in the second FlexE group into an idle field of the first FlexE overhead frame. In addition, the first network device may add the FlexE group adjustment identification information to a first FlexE overhead frame structure.

Optionally, the FlexE group adjustment identification information may be specifically represented by using a value corresponding to group request (GR) information. A GR is information newly defined in an overhead frame in this embodiment of this application. Optionally, the GR may be located after fields that are in an existing overhead frame structure and in which a calendar request (CR) and a calendar acknowledgment (CA) are located. A value of the GR is used to instruct whether to adjust the first FlexE group to the second FlexE group. For example, if a value of a field in which the GR is located is 1, the GR is used to instruct to adjust the first FlexE group to the second FlexE group. If a value of a field in which the GR is located is 0, a FlexE group adjustment instruction is invalid.

Optionally, the idle field may be a reserved field, or may be a field of an inactive calendar in an overhead frame structure. This is not limited in embodiments of the present disclosure.

Optionally, the second FlexE group may be obtained by adding a PHY to the first FlexE group or deleting a PHY from the first FlexE group.

Herein, when sending the first FlexE overhead frame to the second network device, the first network device is ready to adjust the first FlexE group. Specifically, for example, the first network device generates a new FlexE shim module.

Correspondingly, the second network device receives the first FlexE overhead frame. After receiving the first FlexE overhead frame, the second network device also writes the PHY information of the PHY included in the second FlexE group into an idle field of a second FlexE overhead frame. Herein, that the first FlexE group is different from the second FlexE group indicate that a quantity of included PHY members are different, PHY map information corresponding to the first FlexE group is different from PHY map information corresponding to the second FlexE group, and a PHY number of a PHY included in the first FlexE group may be partially different from a PHY number of a PHY included in the second FlexE group. After receiving the first FlexE overhead frame, the second network device correspondingly prepares, based on the FlexE group adjustment identification information in the first FlexE overhead frame, to adjust the first FlexE group, for example, prepares a corresponding shim module.

It should be noted that, when the first network device sends the first FlexE overhead frame to the second network device, information about the first FlexE group coexists with information about the second FlexE group. In other words, configurations such as a PHY map, a PHY number, and a calendar corresponding to the first FlexE group coexist with configurations such as a PHY map, a PHY number, and a calendar corresponding to the second FlexE group. In this case, the first network device does not complete adjustment of the first FlexE group, and a related configuration of the first FlexE group is still used to transmit a service flow. Therefore, the information about the first FlexE group coexists with the information about the second FlexE group, to ensure that the service flow can still be normally transmitted before the first FlexE group is adjusted to the second FlexE group, and can be transmitted continuously without a need to suspend a service to wait until a FlexE group is adjusted.

Optionally, before S301, the first network device needs to first generate the first FlexE overhead frame. Specifically, the first FlexE overhead frame includes eight consecutive blocks, namely, 66 B×8. A shim repeatedly distributes, in a slot sequence, 66 B encapsulated packets on a link of a PHY included in the first FlexE group, and there is one block at an interval of 1023×20 slots on each link (in other words, there is one block at every 13.1 µs). For detailed description of the overhead frame, refer to the description in section 6.4 in the "Flex Ethernet Implementation Agreement" released by the OIF.

S302. The second network device sends the second FlexE overhead frame to the first network device, where the second FlexE overhead frame includes FlexE group adjustment acknowledgment identification information, and the FlexE group adjustment acknowledgment identification information is used to indicate that the second network device notifies the first network device that the second network device is ready to adjust the first FlexE group.

Optionally, the FlexE group adjustment acknowledgment identification information is used to indicate that the second network device agrees that the first network device adjusts the first FlexE group. However, in this case, the second network device does not immediately perform corresponding adjustment. Optionally, the second network device may perform the corresponding adjustment after receiving a service flow subsequently sent by the first network device. Herein, that the first network device subsequently sends the service flow means that the first network device sends the service flow based on the second FlexE group after adjusting the first FlexE group to the second FlexE group.

Optionally, the FlexE group adjustment acknowledgment identification information may be specifically represented by using a value corresponding to group acknowledgment (GA) information. GA is also information newly defined in the overhead frame in this embodiment of this application. For example, the GA is used to notify the first network device that the second network device is also ready to adjust the first FlexE group, for example, the second network device prepares a new FlexE shim Optionally, the GA may be located after a field corresponding to the GR. Alternatively, optionally, a sequence of locations of fields in which the GA and the GR are located is not limited in embodiments of the present disclosure. The GR may be before the GA, or may be after the GA. Alternatively, optionally, a specific location at which the GR/GA is located and that is in the overhead frame is not limited in embodiments of the present disclosure. The specific locations may be after fields in which an existing CR and an existing CA are located, or may occupy another reserved field in the overhead frame. This is not limited in embodiments of the present disclosure.

Optionally, when sending the second FlexE overhead frame to the first network device, the second network device may further add the PHY information of the PHY included in the second FlexE group to the second FlexE overhead frame. This helps the first network device learn that the PHY information of the PHY included in the second FlexE group and confirmed by the second network device is consistent with the PHY information of the PHY included in the second FlexE group sent by the first network device to the second network device by using the first FlexE overhead frame. Therefore, a receive end and a transmit end perform collaborative acknowledgment to subsequently adjust a FlexE group.

Optionally, the second network may actively generate and cache, in a memory, the PHY information of the physical layer (PHY) included in the second FlexE group, and then perform corresponding switching after subsequently receiving a new service flow sent by the first network device, to adjust the first FlexE group to the second FlexE group. Alternatively, in the FlexE group adjustment acknowledgment identifier information sent by the second network device to the first network device, only that the first FlexE group is adjusted to the second FlexE group is agreed. However, the PHY information of the PHY included in the second FlexE group is not generated. Only after a service flow sent by the first network device is subsequently received, information indicating that the FlexE group is to be correspondingly adjusted (that is, the PHY information of the PHY included in the second FlexE group) is generated, and the first FlexE group is adjusted to the second FlexE group.

Correspondingly, the first network device receives the second FlexE overhead frame.

S303. The first network device adjusts the first FlexE group to the second FlexE group based on the PHY information of the PHY included in the second FlexE group.

For example, after receiving the second FlexE overhead frame sent by the second network device, the first network device adds a PHY to the first FlexE group, deletes a PHY from the first FlexE group, or replaces a PHY in the first FlexE group, based on the PHY information of the PHY included in the second FlexE group, to adjust the first FlexE group to the second FlexE group.

Adding a PHY to the first FlexE group is to newly add a PHY to a PHY included in the first FlexE group, to obtain the second FlexE group. For example, if a total quantity of slots corresponding to the PHY included in the first FlexE group is insufficient, and a requirement of a service flow cannot be met, the PHY is added to the first FlexE group. For example, the first FlexE group includes three PHYs, and one PHY is added to the first FlexE group, so that an obtained second FlexE group includes four PHYs.

Deleting a PHY from the first FlexE group is to remove a PHY from PHYs included in the first FlexE group, to obtain the second FlexE group. For example, if slots that carry a service flow and that are at the PHY included in the first FlexE group may be integrated, and there is no need to enable all the PHYs in the first FlexE group, the PHY is deleted from the first FlexE group. For example, the first FlexE group includes four PHYs, and one PHY is deleted from the first FlexE group, so that the obtained second FlexE group includes three PHYs.

Optionally, a PHY in the first FlexE group may further be replaced. Replacing the PHY may be understood as adding a PHY and deleting a PHY, to obtain the second FlexE group. For example, if a rate corresponding to a PHY in the PHYs included in the first FlexE group cannot meet a requirement of a service flow, the PHY is replaced with a PHY having an appropriate rate in the first FlexE group. For example, the first FlexE group includes four PHYs, and one of the PHYs supports a rate of 50 G. In this case, the PHY supporting the rate of 50 G may be replaced with a PHY supporting a rate of 100 G.

Alternatively, if slots that carry a service flow and that are at the PHY included in the first FlexE group may be integrated, although integrated slots are distributed in all the PHYs in the first FlexE group (for example, all slots in three of four PHYs are occupied, and only a small part of slots in a remaining PHY are occupied), slots in one large-capacity PHY are fully occupied, but only a small part of all the slots are occupied. In this case, in the first FlexE group, a PHY in which slots are not fully occupied is replaced with a small-capacity PHY. For example, the first network device may replace a PHY in which only a small part of slots are occupied (for example, a PHY supporting 100 G is replaced with a PHY supporting 50 G), and the PHY obtained after the replacement can meet a slot requirement of the service flow.

S304. The first network device sends a service flow to the second network device based on the second FlexE group.

For example, the service flow sent by the first network device to the second network device includes configuration information such as the PHY map, the PHY number, and the calendar that correspond to the second FlexE group. In this case, the first network device completes adjustment of the first FlexE group, and updates related configuration information such as the PHY map, the PHY number, and the calendar. Therefore, information such as the original PHY map, the original PHY number, and the original calendar of the first FlexE group is not carried. After receiving the service flow sent by the first network device based on the second FlexE group, the second network device may read, from the service flow, the PHY information of the PHY included in the second FlexE group, and obtain, based on the PHY information of the PHY included in the second FlexE group, the configuration information such as the PHY map, the PHY number, and the calendar corresponding to the second FlexE group. The second network device modifies, based on the obtained configuration information such as the PHY map, the PHY number, and the calendar that correspond to the second FlexE group, PHY information corresponding to the first FlexE group of the second network device. Specifically, related to-be-modified content mainly includes the configuration information such as the PHY map, the PHY number, and the calendar. Modified configuration information such as a PHY map, a PHY number, and a calendar is consistent with the PHY information of the second FlexE group used by the first network device to send the service flow. In this way, the first FlexE group is adjusted to the second FlexE group at both the receive end and the transmit end.

In this embodiment, the first network device sends the first FlexE overhead frame to the second network device, and the first FlexE overhead frame includes the FlexE group adjustment identification information and the PHY information of the PHY included in the second FlexE group. The first network device receives the second FlexE overhead frame returned by the second network device. To be specific, the first network device and the second network device learn, through a handshake operation, that both the first network device and the second network device are ready to adjust a current FlexE group. In this way, the first network device adjusts the first FlexE group based on the PHY information of the PHY included in the second FlexE group without a need to suspend a current service, so that a FlexE group can be dynamically adjusted.

In this embodiment, the first network device may be a receive end or a transmit end of the second network device, and the second network device may be a receive end or a transmit end of the first network device. For example, the first network device is a transmit end, and the second network device is a receive end; or the first network device is a receive end, and the second network device is a transmit end. This is not limited in embodiments of the present disclosure.

It should be noted that, in this embodiment of this application, each PHY independently corresponds to one overhead frame. If adjustment of the first FlexE group relates to a plurality of PHYs, the second network device correspondingly prepares for the adjustment only when receiving GRs in overhead frames corresponding to all PHYs. The first network device also determines that the second network device is ready to adjust the first FlexE group only when receiving GAs in the overhead frames corresponding to all the PHYs. The adjustment herein is applicable to an increase or a decrease in a PHY in the first FlexE group. For example, if the first FlexE group includes three PHYs, and the second FlexE group includes four PHYs, only after receiving GAs corresponding to the four PHYs, the first network device adjusts the first FlexE group to the second FlexE group. For another example, if the first FlexE group includes four PHYs, and the second FlexE group includes three PHYs, the first network device sends GRs on overhead frames corresponding to the four PHYs, and adjusts the first FlexE group to the second FlexE group only after receiving four GAs sent by the second network device.

It should be understood that the technical solutions in an embodiment of this application may also be applied to a FlexE multi-hop network scenario, to implement automatic configuration of a FlexE group. Because a FlexE group can be dynamically adjusted without a need to suspend a service, in the FlexE multi-hop network scenario, the technical solutions in this embodiment of this application are more effective than those in the prior art.

It should be further understood that numbers "first" and "second" introduced in this embodiment are merely used to distinguish between different objects, for example, distinguish between different "network devices", or distinguish between different "FlexE groups", or distinguish between different "FlexE overhead frames". This does not constitute any limitation on the protection scope of the embodiments of the present disclosure.

Optionally, in an embodiment of this application, one or more instructions for adjusting the first FlexE group may be triggered through network management, or may be triggered by a software-defined networking (SDN) controller. This is not limited in embodiments of the present disclosure.

Optionally, in an embodiment, S303 includes:
adding, by the first network device, a first PHY to the first FlexE group to obtain the second FlexE group.

Optionally, the first FlexE group may include at least one PHY.

Specifically, the first network device may recombine the first FlexE group, for example, increase a PHY in the first FlexE group, to adjust the first FlexE group to the second FlexE group. For example, during a peak period, a sleeping PHY link needs to be restarted. In this case, a PHY may be added to a current FlexE group.

Optionally, before adding the first PHY, the first network device may also evaluate a service flow transmitted in the first FlexE group. For example, the first network device may estimate, based on historical experience, that a weekend and a time period may be peak hours during which a service flow is transmitted, and then may add a PHY to the first FlexE group. For another example, the first network device detects that the first FlexE group needs to transmit a relatively large total quantity of service flows. However, a total quantity of slots corresponding to a PHY in the first FlexE group is insufficient, and a transmission queue of the service flows is congested. Therefore, in this case, a PHY may be added to the first FlexE group.

Figure 4:
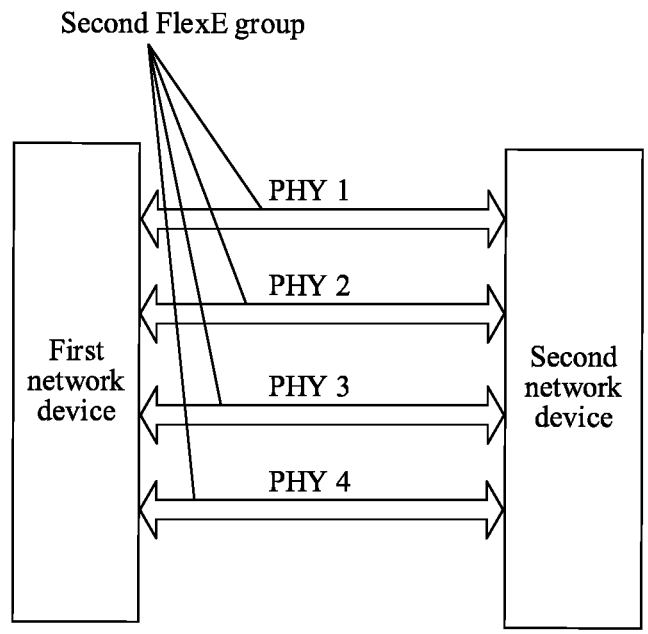
FIG. 4 is a schematic diagram of an example flexible Ethernet according to an embodiment of this application.

For example, as shown in FIG. 4, if a current FlexE group (for example, the first FlexE group) includes a PHY 1 to a PHY 3, the first network device may add a PHY 4 to the current FlexE group based on a service requirement, and an adjusted FlexE group (for example, the second FlexE group) includes the PHY 1 to the PHY 4. Specifically, the first network device may transmit, by using the second FlexE group, service flows of all FlexE clients on a PHY in the first FlexE group. In this way, if the FlexE client has a requirement on increasing slots subsequently, a newly-added PHY may provide available slots, to meet a service requirement.

Optionally, before the first network device adds the first PHY to the first FlexE group, the method 300 further includes:
sending, by the first network device, a third FlexE overhead frame to the second network device, correspondingly, performing, by the second network device, overhead frame locking and overhead multiframe locking on the first PHY based on the third FlexE overhead frame from the first network device, where the third FlexE overhead frame includes PHY information of the first PHY; and performing, by the first network device, overhead frame locking and overhead multiframe locking on the first PHY based on the third FlexE overhead frame from the second network device, where the third FlexE overhead frame includes the PHY information of the first PHY.

It should be noted that the third FlexE overhead frame is first sent by the first network device to the second network device. The third FlexE overhead frame is different from the first FlexE overhead frame and the second FlexE overhead frame that are described above. The third FlexE overhead frame herein is sent by the first network device to the second network device at an interval of 1023 data blocks after the first FlexE overhead frame is sent by the first network device to the second network device. Further, 32 consecutive overhead frames form an overhead multiframe. The second network device performs the overhead frame locking and the overhead multiframe locking on the first PHY after receiving the third FlexE overhead frame. Then, the second network device sends the third FlexE overhead frame to the first network device. The first network device also performs the overhead frame locking and the overhead multiframe locking on the first PHY after receiving the third FlexE overhead frame sent by the second network device. Both the receive end and the transmit end complete a process of locking a same PHY (namely, the first PHY), and both the receive end and the transmit end store the PHY information of the first PHY. Herein, although a PHY number that corresponds to the first PHY and that is at the receive end is the same as a PHY number that corresponds to the first PHY and that is at the transmit end, a locking operation needs to be further performed on the first PHY separately at the receive end and the transmit end, so as to ensure that the first PHY establishes a connection between the receive end and the transmit end.

The following describes a process of overhead frame locking and a process of overhead multiframe locking according to an embodiment of the present disclosure.

In the "Flex Ethernet Implementation Agreement" protocol released by the OIF, each PHY needs to transmit an overhead frame separately. In other words, each PHY needs to complete locking of an overhead frame and an overhead multiframe separately. At intervals of 1023×20 data blocks, there is one block of an overhead frame, and eight blocks can form an overhead frame. For example, the second network device locks an overhead frame corresponding to the first PHY. The second network device needs to identify a field in a block 1 in an overhead frame corresponding to the first PHY (a coding format of the block 1 includes a sync header=10, a control block typr=0x4B, and a 0 code=0x5 that are in the block 1), and after the field is identified, then recognizes another block 1 after an interval of (1023×20+1)×8 blocks. So far, the second network device completes locking of the overhead frame corresponding to the first PHY. Herein, the second network device needs to perform overhead multiframe locking on the first PHY. For the overhead multiframe locking, an OMF field in an overhead frame structure requires attention. When the OMF changes from 0 to 1 or from 1 to 0, it indicates that the overhead multiframe is locked. In a definition of the OIF, the overhead multiframe includes 32 frames. Values of OMFs of first 16 frames are 0, and values of OMFs of last 16 frames are 1. After completing the overhead multiframe locking, the second network device may learn which 32 frames are a group, and which of the 32 frames is a first frame. Operation of the overhead multiframe locking helps the second network device parse out a PHY map in the overhead frame corresponding to the first PHY, and information such as a FlexE group number, a PHY number, and a calendar that correspond to the first PHY. After the overhead frame locking and the overhead multiframe locking are completed, the second network device may start to parse the data block.

In this embodiment, content related to an overhead frame of the newly-added first PHY includes: a FlexE group number that reuses a number corresponding to the first FlexE group; a PHY map that is the PHY map of the first FlexE group; a GR that is set to 1; a PHY map corresponding to the second FlexE group that is written into a preset reserved bit or an inactive calendar; a PHY number that is set to be a PHY number corresponding to the first PHY; and a calendar that is 0 (indicating the calendar is not occupied).

Optionally, the FlexE group number, the PHY map, and the PHY number in the overhead frame of the newly-added first PHY may also be other values. This is not limited in embodiments of the present disclosure. However, when the first FlexE group is adjusted, the FlexE group number, the PHY map, and the PHY number in the overhead frame of the newly-added first PHY need to be adjusted correspondingly to adapt to the second FlexE group.

It should be understood that a quantity of added PHYs is not limited in embodiments of the present disclosure. One PHY may be added, or a plurality of PHYs may be added.

Therefore, the first network device or the second network device performs overhead frame locking and overhead multiframe locking on a to-be-added PHY, and adds the to-be-added PHY to the first FlexE group. A PHY in a FlexE group may be increased based on a service requirement without a need to suspend a service, so that the FlexE group can be dynamically adjusted.

Optionally, in an embodiment, S303 includes:

deleting, by the first network device, a second PHY from the first FlexE group to obtain the second FlexE group, where optionally, the first FlexE group includes a plurality of PHYs.

Specifically, the first network device may recombine the first FlexE group, for example, remove the second PHY in the first FlexE group, to adjust the first FlexE group to the second FlexE group. Specifically, the first network device may integrate traffic of all FlexE clients on a PHY in the first FlexE group (slots that carry service flow traffic and that are in the first FlexE group before adjustment) into a PHY in the second FlexE group. In a traffic integration process, the first network device adjusts a corresponding calendar by using an existing mechanism such as a CR, or CA.

Optionally, before S301, the method 300 further includes:

determining, by the first network device, a first quantity of slots, where the first quantity of slots is used to indicate a quantity of slots that correspond to the first FlexE group and that are not occupied by a service flow;

determining, by the first network device, the second PHY, where a bandwidth of the second PHY is less than or equal to a bandwidth corresponding to the first quantity of slots; and adjusting, by the first network device, a service flow transmitted by the second PHY to a PHY, other than the second PHY, in the first FlexE group.

Specifically, before sending the first FlexE overhead frame to the second network device, the first network device may evaluate a slot that is occupied by service traffic and that is in the first FlexE group, to determine whether service flows of all FlexE clients at a PHY in the first FlexE group may be integrated into a PHY in the second FlexE group. The first network device may learn, through estimation, a quantity of slots that correspond to the first FlexE group and that are not occupied by a service flow, namely, the first quantity of slots. Usually, one PHY corresponds to 20 slots. If the bandwidth corresponding to the first quantity of slots is greater than or equal to a bandwidth corresponding to one PHY (for example, the first quantity of slots is greater than or equal to 20), it may be determined that a deletion operation is performed on the PHY in the first FlexE group. Further, if a bandwidth corresponding to an idle slot of the second PHY in the first FlexE group is less than or equal to the bandwidth corresponding to the first quantity of slots, the first network device may preferably delete the second PHY from the first FlexE group, and adjust a service flow transmitted in the second PHY to a PHY, other than the second PHY, in the first FlexE group.

Optionally, the first network device may preferably remove one PHY that is in the first FlexE group and in which least slot resources are occupied or no slot resource is occupied by service traffic. Alternatively, optionally, the first network device may specify, based on a requirement, a to-be-removed PHY. This is not limited in embodiments of the present disclosure.

For example, the first FlexE group includes the PHY 1 to the PHY 4, each PHY corresponds to 20 slots, and the PHY 1 to the PHY 4 has 80 slots in total. The first network device learns, through detection, that a service flow is unevenly distributed at the PHY 1 to the PHY 4 in the first FlexE group, and occupies 50 slots in total. There are 30 idle slots in the first FlexE group. In this case, the first network device may integrate the service flow that occupies 50 slots into three PHYs. Specifically, a PHY that is at the PHY 1 to the PHY 4 and that is to be removed may be determined based on a bandwidth corresponding to idle slots on each PHY. For example, if the PHY 4 has a maximum quantity of idle slots at the PHY 1 to the PHY 4, the PHY 4 may be preferably deleted, and a service flow at the PHY 4 is adjusted to a PHY, other than the PHY 4, in the first FlexE group.

Figure 5:
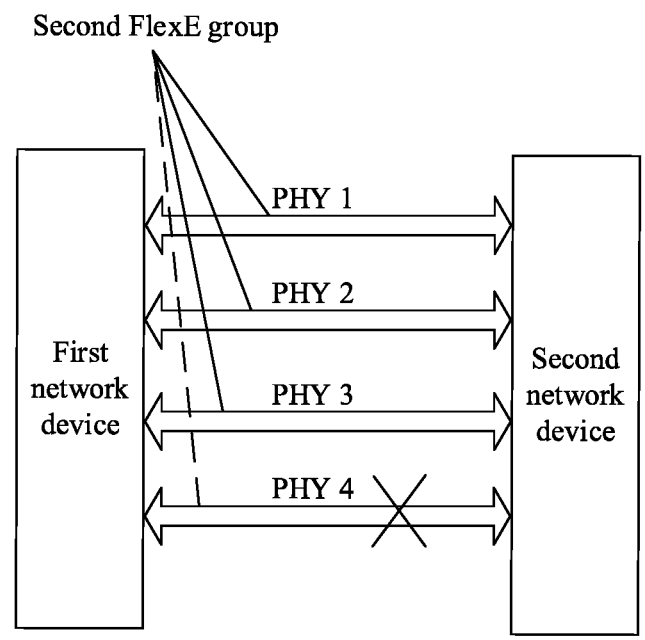
FIG. 5 is a schematic diagram of another example flexible Ethernet according to an embodiment of this application.

Specifically, for example, as shown in FIG. 5, if the first Flex group includes the PHY 1 to the PHY 4, the first network device may remove the PHY 4 from the first FlexE group based on detection of a current service flow, and an adjusted FlexE group (for example, the second FlexE group) includes the PHY 1 to the PHY 3.

It should be understood that a quantity of removed PHYs is not limited in embodiments of the present disclosure. One PHY or a plurality of PHYs may be removed.

Therefore, the first network device detects a service flow corresponding to the first FlexE group, to learn a quantity of slots that are in the slots corresponding to the first FlexE group and that are not occupied by the service flow, determines a to-be-deleted PHY based on the quantity of slots that are not occupied by the service flow, and integrates traffic in the first FlexE group to switch the traffic into the second FlexE group without a need to suspend a service, so that a FlexE group is adjusted dynamically.

It should be understood that, the examples in FIG. 4 and FIG. 5 are only used by a person skilled in the art to understand the embodiments, and are not intended to limit the embodiments of this application to any specific scenario in these examples. A person skilled in the art certainly can make various equivalent modifications or changes according to the examples in FIG. 4 and FIG. 5, and such modifications or changes also fall within the scope of the embodiments of this application.

Optionally, in an embodiment, S303 includes:

replacing, by the first network device, a third PHY in the first FlexE group with a fourth PHY, to obtain the second FlexE group, where optionally, the first FlexE group includes at least one PHY.

Replacing a PHY herein may be understood as an integrated operation in which a PHY is added and a PHY is deleted. In other words, the fourth PHY is added and the third PHY is deleted, to obtain the second FlexE group. The third PHY is different from the fourth PHY. For example, the third PHY and the fourth PHY support different rates, or a slot of the third PHY and a slot of the fourth PHY respectively corresponds to different bandwidth capacities, or a scheduling granularity of the third PHY is different from a scheduling granularity of the fourth PHY. For example, the first network device detects a service flow transmitted at a PHY in the first FlexE group, and finds that a rate corresponding to the third PHY in PHYs included in the first FlexE group cannot meet a requirement of the service flow. Therefore, the third PHY is replaced with the fourth PHY having an appropriate rate in the first FlexE group. For example, the first FlexE group includes four PHYs, and the third PHY supports a rate of 50 G. In this case, the PHY supporting the rate of 50 G may be replaced with the fourth PHY supporting a rate of 100 G.

Alternatively, for another example, the first FlexE group includes the PHY 1 to the PHY 4. If slots that carry a service flow and that are at a PHY included in the first FlexE group may be integrated, although integrated slots are distributed in all PHYs in the first FlexE group, an integrated service flow occupies all slots at the PHY 1, PHY 2, and PHY 3, but slots at the PHY 4 are not fully occupied by the service flow, and only a small part of the slots are occupied, for example, only 4 of 20 slots included at the PHY 4 are occupied. Therefore, the PHY 4 in the first FlexE group is replaced with a PHY 5. The PHY 4 is different from the PHY 5. The PHY 5 includes 10 slots, and the PHY 5 can meet a requirement of the service flow.

Therefore, the first network device detects a service flow corresponding to the first FlexE group, to learn a case in which one or more slots correspond to the first FlexE group are not occupied, and replaces a PHY in the first FlexE group, to obtain the second FlexE group without a need to suspend a service, so that a FlexE group is adjusted dynamically.

Optionally, in an embodiment, the PHY information of the PHY included in the second FlexE group is carried in a reserved field in the first FlexE overhead frame.

Specifically, the first network device may write the PHY information of the PHY included in the second FlexE group into the reserved field in the first FlexE overhead frame.

Similarly, the second network device may also write the PHY information of the PHY included in the second FlexE group into a reserved field in the second FlexE overhead frame. Therefore, the PHY information of the PHY included in the second FlexE group at the receive end is consistent with that at the transmit end.

Alternatively, the PHY information of the PHY included in the second FlexE group is carried in a field of an inactive calendar in the first FlexE overhead frame.

Specifically, the first network device may write the PHY information of the PHY included in the second FlexE group into the field of the inactive calendar in the first FlexE overhead frame.

Similarly, the second network device may write the PHY information of the PHY included in the second FlexE group into a field of an inactive calendar in the second FlexE overhead frame. Therefore, the PHY information of the PHY included in the second FlexE group at the receive end is consistent with that at the transmit end.

Based on the foregoing two cases, in this embodiment, an existing overhead frame structure (refer to specific descriptions about an overhead frame structure in the Flex Ethernet 1.0 Implementation Agreement) is extended, and a PHY map corresponding to the second FlexE group may be written into a reserved field in an overhead frame, or may be written into a field of an inactive calendar. The following provides description with reference to schematic diagrams in FIG. 6 and FIG. 7.

Figure 6:
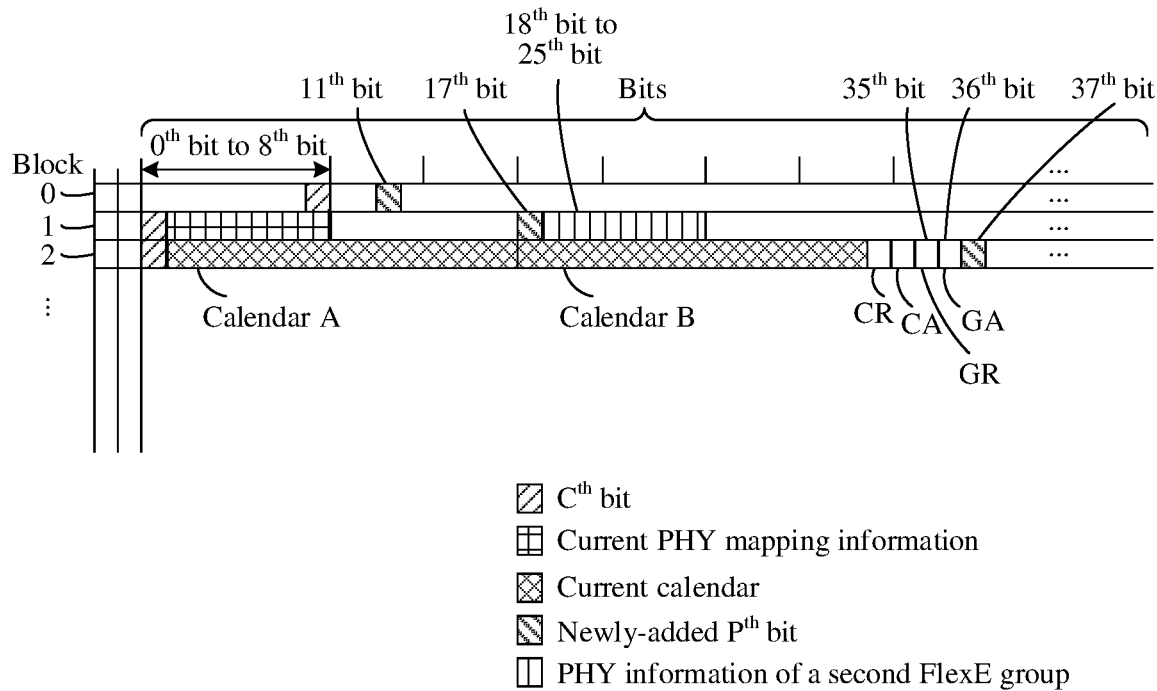
FIG. 6 is a schematic diagram of a non-limiting example overhead frame structure according to an embodiment of this application.

For example, FIG. 6 is a schematic diagram of an example of an overhead frame structure according to an embodiment of this application. As shown in FIG. 6, 8 bits (for example, an $18^{th}$ bit to a $25^{th}$ bit) are selected from a reserved field in a second block of an existing overhead frame structure, and are set to PHY information (a PHY map, which may be referred to as a PHY map B) of a second FlexE group. For ease of distinguishing, the PHY map in the existing overhead frame structure may be referred to as a PHY map A. It should be understood that a manner of parsing the PHY map B by a network device is similar to a manner of parsing the PHY map A by the network device, and the description in the "Flex Ethernet Implementation Agreement" released by the OIF may be reused.

Further, one field is selected from each of a reserved field of a first Block, a reserved field of the second Block, and a reserved field of a third Block in the existing overhead frame structure, and is set to a $P^{th}$ bit. For example, a $11^{th}$ bit location in the first Block, a $17^{th}$ bit location in the second Block, and a $37^{th}$ bit location in the third Block are selected. Herein, the $P^{th}$ bit is set to enable the PHY map B. Herein, a quantity of bit locations is set to 3 through majority selection, to avoid a bit error as much as possible. For example, if two or more of the three bit locations indicate 1, the PHY map B is enabled.

Further, a GR is set after a CR field in the existing overhead frame structure. For example, the GR is set at a $35^{th}$ bit location in the third Block, so that a first network device requests a second network device to adjust a first FlexE group. GA is set after the foregoing GR field. For example, the GA is set at a $36^{th}$ bit location in the third Block, so that the second network device responds to the GR sent by the first network device.

It should be understood that a part in which the overhead frame structure is not modified is not specifically described. For detailed description, refer to the description in the "Flex Ethernet Implementation Agreement" released by the OIF.

It should be further understood that the overhead frame structure is applicable to a forwarding device or a node that uses an overhead frame to transmit a service flow in FlexE, such as the first network device and the second network device.

Therefore, the existing overhead frame structure is extended, and a PHY map corresponding to the second FlexE group is written into a reserved field in an overhead frame, so that the overhead frame structure can be used to dynamic adjustment of a FlexE group.

In the example illustrated in FIG. 6, extension of the overhead frame structure occupies the reserved field. This embodiment of this application further provides a manner for extending the overhead frame structure, and a field of an inactive calendar may be reused.

Figure 7:
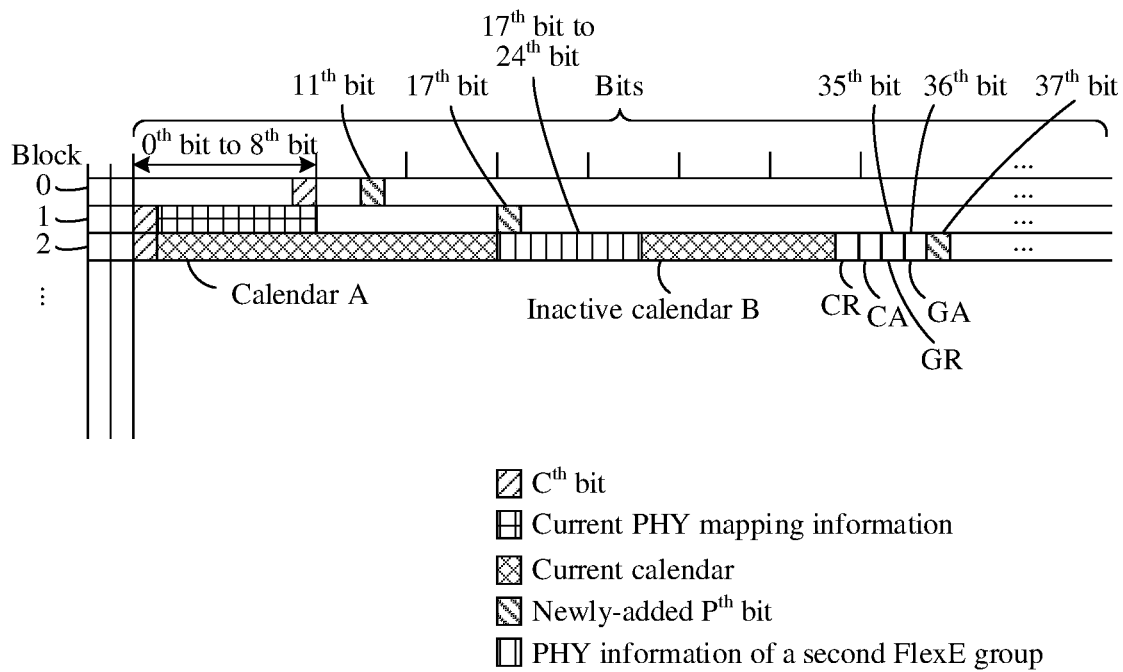
FIG. 7 is a schematic diagram of another example overhead frame structure according to an embodiment of this application.

For example, FIG. 7 is a schematic diagram of an example of an overhead frame structure according to an embodiment of this application. As shown in FIG. 7, 8 bits are selected from a field of an inactive calendar in an existing overhead frame structure, and are set to PHY information (a PHY map, which may be referred to as a PHY map B) of a second FlexE group. Herein, the existing overhead frame structure includes a client calendar A and a client calendar B. Three $C^{th}$ bits in the overhead frame structure determine which calendar is active. For example, when the three $C^{th}$ bits all indicate 0, an inactive calendar is the client calendar B; when the three $C^{th}$ bits all indicate 1, an inactive calendar is the client calendar A; and when two $C^{th}$ bits indicate 1, an inactive calendar is the client calendar A (which is under majority rule). It should be understood that, for locations that are in an overhead frame and at which $C^{th}$ bits, the client calendar A, and the client calendar B are located, and specific meaning of $C^{th}$ bits, the client calendar A, and the client calendar B, refer to descriptions in the Flex Ethernet 1.0 Implementation Agreement.

For example, as shown in FIG. 7, if the inactive calendar is the client calendar B, 8 bits (for example, first 8 bits: a $17^{th}$ bit to a $24^{th}$ bit) may be selected from a field of the client calendar B and written into a PHY map (which may be referred to as the PHY map B, to be differentiated from an original PHY map in the overhead frame) corresponding to the second FlexE group. Alternatively, if the inactive calendar is the client calendar A, 8 bits (for example, first 8 bits: a first bit to an eighth bit, which are not shown in the figure) may be selected from a field of the client calendar A and written into the PHY map corresponding to the second FlexE group.

Similarly, one field may also be selected from each of a reserved field of a first Block, a reserved field of a second Block, and a reserved field of a third Block, and is set to a $P^{th}$ bit. For example, a $11^{th}$ bit location in the first Block, a $17^{th}$ bit location in the second Block, and a $37^{th}$ bit location in the third Block are selected. Herein, the $P^{th}$ bit are set to enable the PHY map B. Herein, a quantity of bit locations is set to 3 to use majority rule, to avoid a bit error as much as possible. For example, if two or more of the three bit locations indicate 1, the PHY map B is enabled.

Similarly, a GR is set after a CR field in the existing overhead frame structure. For example, the GR is set at a $35^{th}$ bit location in the third Block. GA is set after a GR field, for example, the GA is set at a $36^{th}$ bit location in the third Block.

It should be understood that introduction of the foregoing examples is merely intended for a person skilled in the art to understand an extended overhead frame structure (including an extended structure in which an overhead frame of the PHY map corresponding to the second FlexE group is written into a reserved field in the overhead frame; or an extended structure in which an overhead frame of the PHY map corresponding to the second FlexE group is written into a field of an inactive calendar). This is not limited in embodiments of the present disclosure. A person skilled in the art certainly can make various equivalent modifications or changes based on the foregoing examples, and such modifications or changes also fall within the scope of the embodiments of this application.

Therefore, the existing overhead frame structure is extended, and the PHY map corresponding to the second FlexE group is written into the field of the inactive calendar in the overhead frame, so that the overhead frame structure can be used to dynamic adjustment of a current FlexE group.

Optionally, when the PHY information of the PHY included in the second FlexE group is carried in the field of the inactive calendar in the first FlexE overhead frame, the method further includes:

releasing, by the first network device at a preset moment, the field that is occupied by the PHY information of the PHY included in the second FlexE group and that is of the inactive calendar in the first FlexE overhead frame.

To be specific, when switching or adjustment of a FlexE group is completed, the first network device may select a time point to release a field that is occupied by the PHY information of the PHY included in the second FlexE group and that is of the inactive calendar, and reset the specified $P^{th}$ bit. For example, if two or three of $P^{th}$ bits are 1, it indicates that a field of the inactive calendar is occupied in this case. When the field of the inactive calendar is released, the $P^{th}$ bit that are 1 are also set to 0. In this way, time of occupying the field of the inactive calendar can be reduced, and subsequent use of the field of the inactive calendar is not affected.

Similarly, the second network device may perform similar processing. To be specific, the second network device releases, at a preset moment, the field that is occupied by the PHY information of the PHY included in the second FlexE group and that is of an inactive calendar in the second FlexE overhead frame.

Optionally, when adjusting the first FlexE group to the second FlexE group, the first network device or the second network device may rewrite a PHY map of the existing overhead frame structure (for example, write the PHY map corresponding to the second FlexE group into the PHY map of the existing overhead frame structure). In this case, a value of the $P^{th}$ bit does not indicate whether PHY bitmap mapping information corresponding to the second FlexE group is enabled. Instead, the following manner is used: When the value indicated by the $P^{th}$ bit changes from 0 to 1, or changes from 1 to 0, it indicates that the first FlexE group is being adjusted. In this case, a receive end needs to perform parsing and verification based on a configuration corresponding to a PHY map (namely, the PHY map corresponding to the second FlexE group) that is negotiated in advance, to match a FlexE group at a transmit end. Herein, if PHY map information parsed out by the receive end is inconsistent with a current configuration, the receive end does not report an error, but performs matching verification with the PHY map corresponding to the second FlexE group and modifies a PHY map configuration of the receive end.

The method for transmitting a service flow based on the flexible Ethernet according to this embodiment of this application is described above, and the following describes an apparatus for transmitting a service flow based on the flexible Ethernet.

Figure 8:
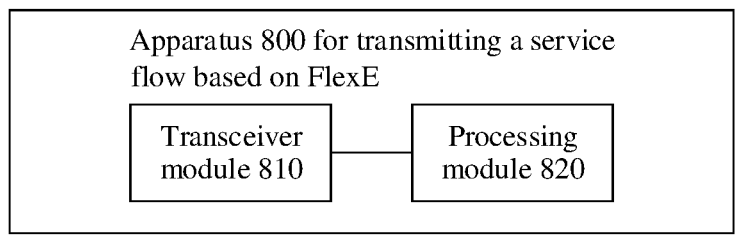
FIG. 8 is a schematic block diagram of an apparatus for transmitting a service flow based on flexible Ethernet (FlexE) according to an embodiment of this application.

FIG. 8 is a schematic block diagram of an apparatus 800 for transmitting a service flow based on flexible Ethernet according to an embodiment of this application. The flexible Ethernet includes a first network device and a second network device, and the first network device and the second network device transmit the service flow by using a first FlexE group. The apparatus 800 is the first network device. As shown in FIG. 8, the apparatus 800 includes a transceiver module 810 and a processing module 820.

The transceiver module 810 is configured to send a first FlexE overhead frame to the second network device. The first FlexE overhead frame includes FlexE group adjustment identification information and PHY information of a physical layer (PHY) included in a second FlexE group, the FlexE group adjustment identification information is used to indicate that the first network device requests the second network device to adjust the first FlexE group to the second FlexE group, and the first FlexE group is different from the second FlexE group.

The transceiver module 810 is further configured to receive a second FlexE overhead frame sent by the second network device. The second FlexE overhead frame includes FlexE group adjustment acknowledgment identification information, and the FlexE group adjustment acknowledgment identification information is used to indicate that the second network device notifies the first network device that the second network device is ready to adjust the first FlexE group.

The processing module 820 is configured to adjust the first FlexE group to the second FlexE group based on the PHY information of the physical layer (PHY) included in the second FlexE group.

The transceiver module 810 is further configured to send a service flow to the second network device based on the second FlexE group.

Optionally, in an embodiment, the processing module 820 is specifically configured to:

add a first PHY to the first FlexE group to obtain the second FlexE group.

Optionally, before the first network device adds the first PHY to the first FlexE group, the processing module 820 is further configured to:

perform overhead frame locking and overhead multiframe locking on the first PHY based on a third FlexE overhead frame from the second network device, where the third FlexE overhead frame includes PHY information of the first PHY.

Optionally, in an embodiment, the processing module 820 is specifically configured to:

delete a second PHY from the first FlexE group to obtain the second FlexE group.

Optionally, before the first network device sends the first FlexE overhead frame to the second network device, the processing module 820 is further configured to:

determine a first quantity of slots, where the first quantity of slots is used to indicate a quantity of slots that correspond to the first FlexE group and that are not occupied by the service flow; determine the second PHY, where a bandwidth of the second PHY is less than or equal to a bandwidth corresponding to the first quantity of slots; and adjust a service flow transmitted by the second PHY to a PHY, other than the second PHY, in the first FlexE group.

Optionally, the PHY information of the PHY included in the second FlexE group is carried in a reserved field in the first FlexE overhead frame; or the PHY information of the PHY included in the second FlexE group is carried in a field of an inactive calendar in the first FlexE overhead frame.

Optionally, when the PHY information of the physical layer (PHY) included in the second FlexE group is carried in the field of the inactive calendar in the first FlexE overhead frame, the processing module 820 is further configured to:

release, at a preset moment, the field that is occupied by the PHY information of the PHY included in the second FlexE group and that is of the inactive calendar in the first FlexE overhead frame.

It should be understood that the apparatus 800 according to this embodiment of this application may correspond to the method on a first network device side in the method 300 for transmitting a service flow based on flexible Ethernet (FlexE) in the foregoing method embodiments. In addition, the foregoing and other management operations and/or functions of the modules in the apparatus 800 are separately used to implement corresponding steps in the foregoing methods, and therefore, can also implement beneficial effects in the foregoing method embodiments. For brevity, details are not described herein again.

It should be further understood that the transceiver module 810 may be implemented by a transceiver, and the processing module 820 may be implemented by a processor. Optionally, the transceiver may be decomposed into a receiver (performing a receiving function in the transceiver module 810) and a transmitter (performing a sending function in the transceiver module 810).

Figure 9:
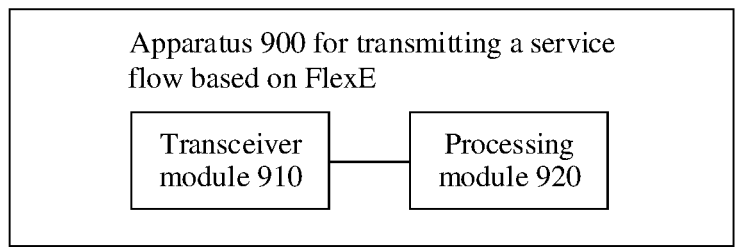
FIG. 9 is a schematic block diagram of an apparatus for transmitting a service flow based on flexible Ethernet (FlexE) according to another embodiment of this application.

FIG. 9 is a schematic block diagram of an apparatus 900 for transmitting a service flow based on flexible Ethernet (FlexE) according to an embodiment of this application. The flexible Ethernet includes a first network device and a second network device, and the first network device and the second network device transmit the service flow by using a first FlexE group. The apparatus 900 is the second network device. As shown in FIG. 9, the apparatus 900 includes a transceiver module 910 and a processing module 920.

The transceiver module 910 is configured to receive a first FlexE overhead frame sent by the first network device. The first FlexE overhead frame includes FlexE group adjustment identification information and PHY information of a physical layer (PHY) included in a second FlexE group, the FlexE group adjustment identification information is used to indicate that the first network device requests the second network device to adjust the first FlexE group to the second FlexE group, and the first FlexE group is different from the second FlexE group.

The processing module 920 is configured to generate a second FlexE overhead frame. The second FlexE overhead frame includes FlexE group adjustment acknowledgment identification information, and the FlexE group adjustment acknowledgment identification information is used to indicate that the second network device notifies the first network device that the second network device is ready to adjust the first FlexE group.

The transceiver module 910 is further configured to send the second FlexE overhead frame to the first network device.

The transceiver module 910 is further configured to receive the service flow sent by the first network device based on the second FlexE group.

Optionally, the processing module 920 is further configured to adjust the first FlexE group to the second FlexE group based on PHY information in the service flow.

Optionally, the second FlexE group is obtained after the first network device adds a first PHY to the first FlexE group.

Optionally, the processing module 920 is further configured to:

perform overhead frame locking and overhead multiframe locking on the first PHY based on a third FlexE overhead frame from the first network device, where the third FlexE overhead frame includes PHY information of the first PHY.

Optionally, the second FlexE group is obtained after the first network device deletes a second PHY from the first FlexE group.

Optionally, the PHY information of the PHY included in the second FlexE group is carried in a reserved field in the first FlexE overhead frame; or the PHY information of the PHY included in the second FlexE group is carried in a field of an inactive calendar in the first FlexE overhead frame.

It should be understood that the apparatus 900 according to this embodiment may correspond to the method on a second network device side in the method 300 for transmitting a service flow based on flexible Ethernet (FlexE) in the foregoing method embodiments. In addition, the foregoing and other management operations and/or functions of the modules in the apparatus 900 are separately used to implement corresponding steps in the foregoing methods, and therefore, can also implement beneficial effects in the foregoing method embodiments. For brevity, details are not described herein again.

It should be further understood that the transceiver module 910 may be implemented by a transceiver, and the processing module 920 may be implemented by a processor. Optionally, the transceiver may be decomposed into a receiver (performing a receiving function in the transceiver module 910) and a transmitter (performing a sending function in the transceiver module 910).

Figure 10:
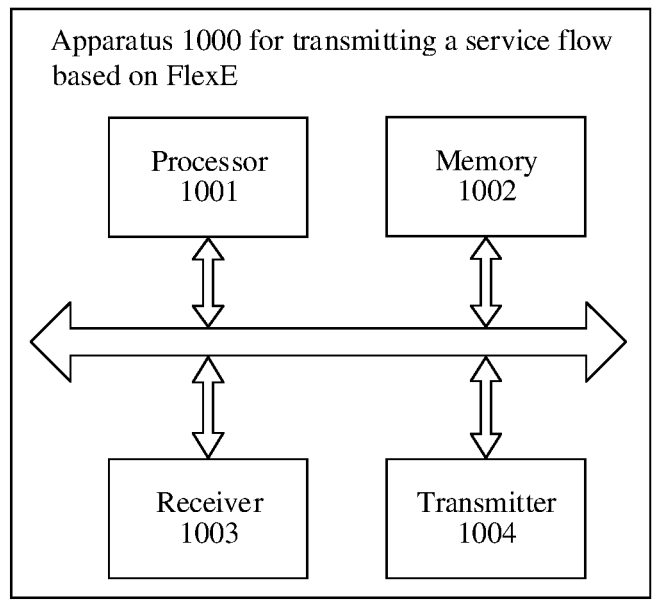
FIG. 10 is a structural block diagram of an apparatus for transmitting a service flow based on flexible Ethernet (FlexE) according to an embodiment of this application.

FIG. 10 is a structural block diagram of an apparatus 1000 for transmitting a service flow based on flexible Ethernet (FlexE) according to an embodiment of this application. The apparatus 1000 shown in FIG. 10 includes: a processor 1001, a memory 1002, a receiver 1003, and a transmitter 1004.

The processor 1001, the memory 1002, the receiver 1003, and the transmitter 1004 communicate with each other by using an internal connection path, and transmit a control signal and/or a data signal. In a possible implementation, the processor 1001, the memory 1002, the receiver 1003, and the transmitter 1004 may be implemented by using a chip. The memory 1002 may store program code, and the processor 1001 invokes the program code stored in the memory 1002, to implement a corresponding function of the apparatus 1000.

The transmitter 1004 is configured to send a first FlexE overhead frame to the second network device. The first FlexE overhead frame includes FlexE group adjustment identification information and PHY information of a physical layer (PHY) included in a second FlexE group. The FlexE group adjustment identification information is used to indicate that the first network device requests the second network device to adjust the first FlexE group to the second FlexE group, and the first FlexE group is different from the second FlexE group.

The receiver 1003 is configured to receive a second FlexE overhead frame sent by the second network device. The second FlexE overhead frame includes FlexE group adjustment acknowledgment identification information, and the FlexE group adjustment acknowledgment identification information is used to indicate that the second network device notifies the first network device that the second network device is ready to adjust the first FlexE group.

The processor 1001 is configured to adjust the first FlexE group to the second FlexE group based on the PHY information of the physical layer (PHY) included in the second FlexE group.

The transmitter 1004 is further configured to send a service flow to the second network device based on the second FlexE group.

The processor 1001 is specifically configured to add a first PHY to the first FlexE group to obtain the second FlexE group.

Optionally, before the first network device adds the first PHY to the first FlexE group, the processor 1001 is further configured to:

perform overhead frame locking and overhead multiframe locking on the first PHY based on a third FlexE overhead frame from the second network device, where the third FlexE overhead frame includes PHY information of the first PHY.

Optionally, the processor 1001 is specifically configured to delete a second PHY from the first FlexE group to obtain the second FlexE group.

Optionally, before the first network device sends the first FlexE overhead frame to the second network device, the processor 1001 is further configured to:

determine a first quantity of slots, where the first quantity of slots is used to indicate a quantity of slots that correspond to the first FlexE group and that are not occupied by the service flow; determine the second PHY, where a bandwidth of the second PHY is less than or equal to a bandwidth corresponding to the first quantity of slots; and adjust a service flow transmitted by the second PHY to a PHY, other than the second PHY, in the first FlexE group.

Optionally, the PHY information of the PHY included in the second FlexE group is carried in a reserved field of the first FlexE overhead frame; or the PHY information of the PHY included in the second FlexE group is carried in a field of an inactive calendar in the first FlexE overhead frame.

Optionally, when the PHY information of the physical layer (PHY) included in the second FlexE group is carried in the field of the inactive calendar in the first FlexE overhead frame, the processor 1001 is further configured to:

release, at a preset moment, the field that is occupied by the PHY information of the PHY included in the second FlexE group and that is of the inactive calendar in the first FlexE overhead frame.

Figure 11:
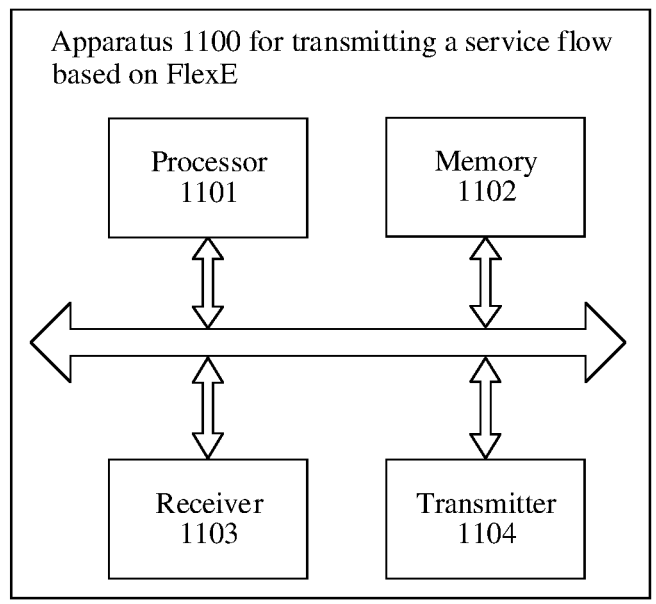
FIG. 11 is a structural block diagram of an apparatus for transmitting a service flow based on flexible Ethernet (FlexE) according to another embodiment of this application.

FIG. 11 is a structural block diagram of an apparatus 1100 for transmitting a service flow based on flexible Ethernet (FlexE) according to an embodiment of this application. The apparatus 1100 shown in FIG. 11 includes a processor 1101, a memory 1102, a receiver 1103, and a transmitter 1104.

The processor 1101, the memory 1102, the receiver 1103, and the transmitter 1104 communicate with each other by using an internal connection path, and transmit a control signal and/or a data signal. In a possible implementation, the processor 1101, the memory 1102, the receiver 1103, and the transmitter 1104 may be implemented by using a chip. The memory 1102 may store program code, and the processor 1101 invokes the program code stored in the memory 1102, to implement a corresponding function of the apparatus 1100.

The receiver 1103 is configured to receive a first FlexE overhead frame sent by the first network device. The first FlexE overhead frame includes FlexE group adjustment identification information and PHY information of a physical layer (PHY) included in a second FlexE group. The FlexE group adjustment identification information is used to indicate that the first network device requests the second network device to adjust the first FlexE group to the second FlexE group, and the first FlexE group is different from the second FlexE group.

The processor 1101 is configured to generate a second FlexE overhead frame based on the first FlexE overhead frame. The second FlexE overhead frame includes FlexE group adjustment acknowledgment identification information, and the FlexE group adjustment acknowledgment identification information is used to indicate that the second network device notifies the first network device that the second network device is ready to adjust the first FlexE group.

The transmitter 1104 is configured to send the second FlexE overhead frame to the first network device.

The receiver 1103 is further configured to receive a service flow sent by the first network device based on the second FlexE group.

The processor 1101 is further configured to adjust the first FlexE group to the second FlexE group based on PHY information in the service flow.

Optionally, the second FlexE group is obtained after the first network device adds a first PHY to the first FlexE group.

Optionally, the processor 1101 is further configured to perform overhead frame locking and overhead multiframe locking on the first PHY based on a third FlexE overhead frame from the first network device. The third FlexE overhead frame includes PHY information of the first PHY.

Optionally, the second FlexE group is obtained after the first network device deletes a second PHY from the first FlexE group.

Optionally, the PHY information of the PHY included in the second FlexE group is carried in a reserved field of the first FlexE overhead frame; or the PHY information of the PHY included in the second FlexE group is carried in a field of an inactive calendar in the first FlexE overhead frame.

The methods disclosed in the embodiments of this application may be applied to a processor or may be implemented by a processor. The processor may be an integrated circuit chip and has a signal processing capability. In an implementation process, steps of the foregoing methods may be implemented by using an integrated logical circuit of hardware in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processor (DSP), a micro controller unit (MCU), a programmable logic device (PLD), or another integrated chip. The processor may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly embodied as being executed by a hardware decoding processor, or executed by a combination of hardware of a decoding processor and a software module. The software module may be located in an existing storage medium in the art, such as a random access memory (RAM), a flash memory, a read-only memory (ROM), a programmable read-only memory, an electrically erasable programmable memory, a register, or the like. The storage medium is located in the memory, and the processor reads instructions in the memory and completes the steps in the foregoing methods in combination with hardware of the processor.

It can be understood that when the embodiments of this application are applied to a chip in a network device, the chip implements functions of the network device in the foregoing method embodiments.

It should be understood that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of technical solutions. A person skilled in the art may use different methods to implement the described functions for each particular application, but it should not be considered that the implementations go beyond the scope of this application.

It may be clearly understood by people skilled in the art that, for the purpose of convenient and brief description, for a detailed working process of the foregoing systems, apparatuses, and units, refer to corresponding processes in the foregoing method embodiments, and details are not described herein again.

In several embodiments provided in this application, it should be understood that, the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or some of the technical solutions may be implemented in a form of a software product. The computer software product is stored in a storage medium, and includes instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a first network device for transmitting a service flow based on flexible Ethernet (FlexE) comprising the first network device and a second network device, wherein the first network device and the second network device transmit the service flow by using a first FlexE group, and the method comprises:

sending a first FlexE overhead frame to the second network device, wherein the first FlexE overhead frame comprises FlexE group adjustment identification information and PHY information of a physical layer (PHY) in a second FlexE group, the FlexE group adjustment identification information is indicative of that the first network device requests the second network device to be ready for the first network device to adjust the first FlexE group to obtain the second FlexE group is different from the second FlexE group;

receiving a second FlexE overhead frame sent by the second network device, wherein the second FlexE overhead frame comprises FlexE group adjustment acknowledgment identification information, and the FlexE group adjustment acknowledgment identification information is indicative of that the second network device notifies the first network device that the second network device is ready for adjustment of the first FlexE group to be performed by the first network device;

adjusting the first FlexE group to obtain the second FlexE group based on the PHY information of the physical layer (PHY) in the second FlexE group; and sending the service flow to the second network device based on the second FlexE group.

2. The method according to claim 1, wherein the adjusting the first FlexE group to obtain the second FlexE group comprises:

adding a first PHY to the first FlexE group to obtain the second FlexE group.

3. The method according to claim 2, further comprising, before adding the first PHY to the first FlexE group:

performing overhead frame locking and overhead multiframe locking on the first PHY based on a third FlexE overhead frame from the second network device, wherein the third FlexE overhead frame comprises PHY information of the first PHY.

4. The method according to claim 1, wherein the adjusting the first FlexE group to obtain the second FlexE group comprises:

deleting a second PHY from the first FlexE group to obtain the second FlexE group.

5. The method according to claim 4, further comprising, before sending the first FlexE overhead frame to the second network device:

determining a first quantity of slots indicative of a quantity of slots that correspond to the first FlexE group and that are not occupied by the service flow;

determining the second PHY, wherein a bandwidth of the second PHY is less than or equal to a bandwidth corresponding to the first quantity of slots; and adjusting a service flow transmitted by the second PHY to be transmitted by another PHY in the first FlexE group.

6. The method according to claim 1, wherein the PHY information of the PHY in the second FlexE group is carried in a reserved field in the first FlexE overhead frame; or the PHY information of the PHY in the second FlexE group is carried in a field of an inactive calendar in the first FlexE overhead frame.

7. The method according to claim 6, further comprising, when the PHY information of the physical layer (PHY) in the second FlexE group is carried in the field of the inactive calendar in the first FlexE overhead frame:

releasing, at a preset time, the field that is occupied by the PHY information of the PHY in the second FlexE group and that is of the inactive calendar in the first FlexE overhead frame.

8. An apparatus for transmitting a service flow based on flexible Ethernet (FlexE) comprising a first network device and a second network device, wherein the first network device and the second network device transmit the service flow by using a first FlexE group, the apparatus is the first network device, and the apparatus comprises:
- a transmitter, configured to send a first FlexE overhead frame to the second network device, wherein the first FlexE overhead frame comprises FlexE group adjustment identification information and PHY information of a physical layer (PHY) in a second FlexE group, the FlexE group adjustment identification information is indicative of that the first network device requests the second network device to be ready for the first network device to adjust the first FlexE group to obtain the second FlexE group, and the first FlexE group is different from the second FlexE group;
- a receiver, configured to receive a second FlexE overhead frame sent by the second network device, wherein the second FlexE overhead frame comprises FlexE group adjustment acknowledgment identification information, and the FlexE group adjustment acknowledgment identification information is indicative of that the second network device notifies the first network device that the second network device is ready for adjustment of the first FlexE group to be performed by the apparatus; and
- a processor, configured to adjust the first FlexE group to obtain the second FlexE group based on the PHY information of the physical layer (PHY) in the second FlexE group, wherein
- the transmitter is further configured to send the service flow to the second network device based on the second FlexE group.

9. The apparatus according to claim 8, wherein the processor is further configured to:
- add a first PHY to the first FlexE group to obtain the second FlexE group.

10. The apparatus according to claim 9, wherein before adding the first PHY to the first FlexE group, the processor is further configured to:
- perform overhead frame locking and overhead multiframe locking on the first PHY based on a third FlexE overhead frame from the second network device, wherein the third FlexE overhead frame comprises PHY information of the first PHY.

11. The apparatus according to claim 8, wherein the processor is further configured to:
- delete a second PHY from the first FlexE group to obtain the second FlexE group.

12. The apparatus according to claim 11, wherein the processor is further configured to, before the transmitter sends the first FlexE overhead frame to the second network device,
- determine a first quantity of slots indicative of a quantity of slots that correspond to the first FlexE group and that are not occupied by the service flow; determine the second PHY, wherein a bandwidth of the second PHY is less than or equal to a bandwidth corresponding to the first quantity of slots; and adjust a service flow transmitted by the second PHY to be transmitted by another PHY in the first FlexE group.

13. The apparatus according to claim 8, wherein the PHY information of the PHY in the second FlexE group is carried in a reserved field in the first FlexE overhead frame; or
- the PHY information of the PHY in the second FlexE group is carried in a field of an inactive calendar in the first FlexE overhead frame.

14. The apparatus according to claim 13, wherein the processor is further configured to, when the PHY information of the physical layer (PHY) in the second FlexE group is carried in the field of the inactive calendar in the first FlexE overhead frame,
- release, at a preset time, the field that is occupied by the PHY information of the PHY in the second FlexE group and that is of the inactive calendar in the first FlexE overhead frame.

15. An apparatus for transmitting a service flow based on flexible Ethernet (FlexE) comprising a first network device and a second network device, wherein the first network device and the second network device transmit the service flow by using a first FlexE group, the apparatus is the second network device, and the apparatus comprises:
- a receiver, configured to receive a first FlexE overhead frame sent by the first network device, wherein the first FlexE overhead frame comprises FlexE group adjustment identification information and PHY information of a physical layer (PHY) in a second FlexE group, the FlexE group adjustment identification information is indicative of that the first network device requests the second network device to be ready for the first network device to adjust the first FlexE group to obtain the second FlexE group, and the first FlexE group is different from the second FlexE group;
- a processor, configured to generate a second FlexE overhead frame based on the first FlexE overhead frame, wherein the second FlexE overhead frame comprises FlexE group adjustment acknowledgment identification information, and the FlexE group adjustment acknowledgment identification information is indicative of that the second network device notifies the first network device that the second network device is ready for adjustment of the first FlexE group to be performed by the first network device; and
- a transmitter, configured to send the second FlexE overhead frame to the first network device, wherein
- the receiver is further configured to receive the service flow sent by the first network device based on the second FlexE group.

16. The apparatus according to claim 15, wherein the second FlexE group is obtained after the first network device adds a first PHY to the first FlexE group.

17. The apparatus according to claim 16, wherein the processor is further configured to:
- perform overhead frame locking and overhead multiframe locking on the first PHY based on a third FlexE overhead frame from the first network device, wherein the third FlexE overhead frame comprises PHY information of the first PHY.

18. The apparatus according to claim 15, wherein the second FlexE group is obtained after the first network device deletes a second PHY from the first FlexE group.

19. The apparatus according to claim 15, wherein the PHY information of the PHY in the second FlexE group is carried in a reserved field in the first FlexE overhead frame; or
- the PHY information of the PHY in the second FlexE group is carried in a field of an inactive calendar in the first FlexE overhead frame.

* * * * *

UNITED STATES PATENT AND TRADEMARK OFFICE
CERTIFICATE OF CORRECTION

PATENT NO. : 11,469,844 B2
APPLICATION NO. : 16/910759
DATED : October 11, 2022
INVENTOR(S) : Zongpeng Du et al.

It is certified that error appears in the above-identified patent and that said Letters Patent is hereby corrected as shown below:

In the Claims

Column 28, Claim 1, Line 9, change "the second FlexE group is" to "the second FlexE group, and the first FlexE group is".

Signed and Sealed this
Fifteenth Day of November, 2022

Katherine Kelly Vidal
*Director of the United States Patent and Trademark Office*